(12) United States Patent
Im

(10) Patent No.: US 7,893,928 B2
(45) Date of Patent: Feb. 22, 2011

(54) COMPUTER SYSTEM AND CONTROL METHOD THEREFOR

(75) Inventor: Jae-seong Im, Yongin-si (KR)

(73) Assignee: Samsung Electonics Co., Ltd., Suwon-Si (KR)

( * ) Notice: Subject to any disclaimer, the term of this patent is extended or adjusted under 35 U.S.C. 154(b) by 958 days.

(21) Appl. No.: 11/746,262

(22) Filed: May 9, 2007

(65) Prior Publication Data

US 2008/0062138 A1   Mar. 13, 2008

(30) Foreign Application Priority Data

Sep. 11, 2006   (KR)   ...................... 10-2006-0087576

(51) Int. Cl.
*G06F 3/041*   (2006.01)
(52) U.S. Cl. ........................ 345/173; 345/168; 345/179
(58) Field of Classification Search .......... 345/173–179
See application file for complete search history.

(56) References Cited

U.S. PATENT DOCUMENTS 5,956,021 A  *  9/1999  Kubota et al. ............... 345/179

FOREIGN PATENT DOCUMENTS

| CN | 1383050 | 12/2002 |
|----|---------|---------|
| CN | 1777858 | 5/2006 |
| JP | 2005-326905 | 11/2005 |
| KR | 2001-19498 | 3/2001 |
| KR | 2003-35226 | 5/2003 |
| KR | 2005-48758 | 5/2005 |

* cited by examiner

*Primary Examiner*—Nitin Patel
(74) *Attorney, Agent, or Firm*—Jefferson IP Law, LLC

(57) ABSTRACT

A computer system includes a touch pad having plural key areas and generating a key signal according to a touch input with respect to the respective key areas, a display, a storing unit for storing a relation table of the character value corresponding to the key area, and a controller reading the character value corresponding to the concerned key area from the storing unit and displaying the same on the display if a key signal is generated in the touch pad, and if the key signals are successively generated with respect to the plural key areas, sequentially converting and displaying the character values corresponding to the successive key areas.

23 Claims, 5 Drawing Sheets

FIG. 3A

| A | B | C | D | E | F | G |
|---|---|---|---|---|---|---|
| H | I | J | K | L | M | N |
| O | P | Q | R | S | T | U |
| V | W | X | Y | Z | SPACE | ↵ |

COMPUTER SYSTEM AND CONTROL METHOD THEREFOR

CROSS-REFERENCE TO RELATED APPLICATIONS

This application claims the benefit of Korean Patent Application No. 2006-87576, filed Sep. 11, 2006, in the Korean Intellectual Property Office, the disclosure of which is incorporated herein by reference.

BACKGROUND OF THE INVENTION

1. Field of the Invention

Aspects of the present invention relate to a computer system and a control method thereof, and more particularly, to a computer system having a touch pad and a control method thereof.

2. Description of the Related Art

Generally, a computer system comprises a main body part, a display to display an image, and an inputting device connected with the main body unit to input commands and data. Keyboards and mice are widely used inputting devices.

Recently, computer systems have begun including a touch pad as an input device. The touch pad is usually arranged in a planar shape, provided in a portable computer as a pointing device, and functions like a mouse. If a user moves a finger along the surface of the touch pad, pressure caused by the finger is converted into a voltage or into an electric current. The CPU calculates position coordinates of areas touched by the finger based on the converted signal. The position of a cursor or a pointer displayed on a monitor is moved, or an operation such as a mouse click or a movement of a scroll bar can be performed, according to the calculated position coordinates.

However, in conventional computer systems provided with touch pads, the touch pad can perform only the functions of a mouse. Accordingly, a keyboard to input characters should also be provided. In addition, as the size of computers continues to decrease, the inclusion of both a touch panel and a keyboard in the computer may create portability problems due to the larger volume needed to incorporate both types of input devices into the same system.

Computers incorporating the touch screen into the display receive pressure signals generated as a user touches the surface of the touch screen/display. The computer translates the pressure signals into the motion of a pointer or the inputting of a character. However, if characters are inputted through the touch screen, part of the display can not be utilized, since a portion of the visual space is taken up by a virtual keyboard.

SUMMARY OF THE INVENTION

Aspects of the invention provide a computer system and a control method of the computer system capable of easily inputting characters through the touch pad. Also, the computer system and the control method of the computer system can be minimized in its size by replacing a touch pad for a function of a conventional mouse and a keyboard.

Additional aspects of the present invention will be set forth in part in the description which follows and, in part, will be obvious from the description, or may be learned by practice of the general inventive concept.

According to an aspect of the present invention, a computer system is provided comprising a touch pad having a plurality of key areas to generate a key signal according to a touch input, the key signal corresponding to one of the key areas; a display; a storing unit to store a relation table relating each of a plurality of character values to a corresponding key area in the plurality of key areas; and a controller to read, from the storing unit, the character value corresponding to a key area corresponding to the key signal generated in the touch pad and to display the character value on the display if a key signal is generated in the touch pad, and if successive key signals are generated with respect to the plurality of key areas, to sequentially convert the successive key signals into the corresponding successive character values and to display each of the successive character values on the display by replacing a previously displayed character value with the character value to be displayed.

According to another embodiment of the present invention, the controller comprises a driver to convert the character value generated from the touch pad into the character value corresponding to the key signal, and an application to processing the converted character value and to displaying the character value on the display unit.

According to another embodiment of the present invention, when the key signal disappears, the controller displays the character value corresponding to the key area in which the key signal disappeared.

According to another embodiment of the present invention, the computer system further comprises a user selecting unit to set the character values corresponding to the key areas; wherein the controller stores in the storing unit the character values set by the user selecting unit.

According to another aspect of the present invention, a control method of a computer system having a touch pad comprises: determining whether a key signal is generated in the touch pad; displaying a character value corresponding to the key area in which the key signal way generated; determining whether successive key signals were generated; converting each of the successive key signals into the character value corresponding to the key signal corresponding to the key area if successive key signals were generated; and displaying the character values corresponding to the successive key areas if successive key signals were generated.

According to another embodiment of the present invention, the control method of the computer system further comprises displaying the character value corresponding to the key area in which the key signal disappeared if the key signal disappeared.

According to another embodiment of the present invention, the control method of the computer system further comprises storing the character value corresponding to the key area.

According to another embodiment of the present invention, storing the character value comprises setting the character values corresponding to the key areas and storing the set character values.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other aspects and advantages of the invention will become apparent and more readily appreciated from the following description of the embodiments, taken in conjunction with the accompanying drawings of which:

FIGS. 3A and 3B are drawings illustrating character values preset corresponding to key areas of a touch pad according to an exemplary embodiment of the present invention.

DETAILED DESCRIPTION OF THE EMBODIMENTS

Figure 1:
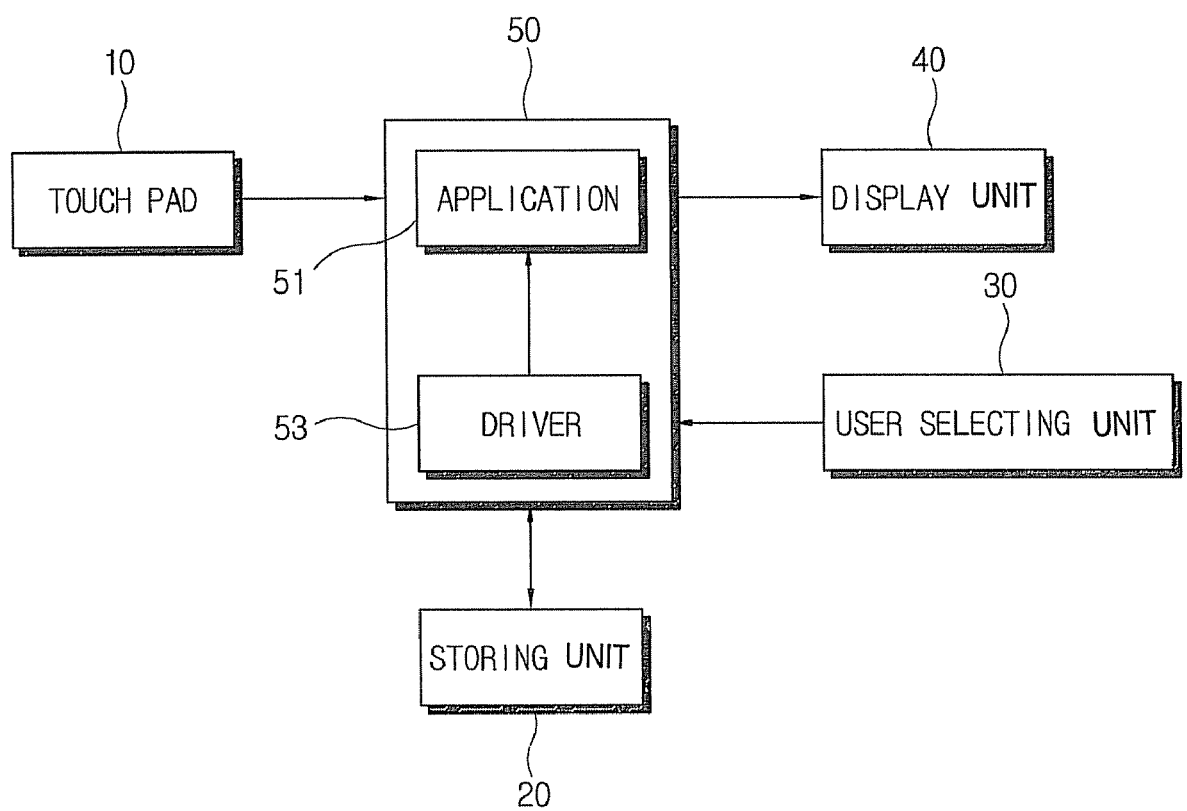
FIG. 1 is a control block diagram of a computer system according to an exemplary embodiment of the present invention.

Reference will now be made in detail to the present embodiments of the present invention, examples of which are illustrated in the accompanying drawings, wherein like reference numerals refer to like elements throughout. The embodiments are described below in order to explain the present invention by referring to the figures.

As shown in FIG. 1, a computer system according to the present invention comprises a touch pad 10, a display 40, a user selecting unit 30, a storing unit 20, and a controller 50. The computer system may be a desktop system, a notebook (portable computer), a portable entertainment device, a mobile phone, or any computing device requiring user input.

The touch pad 10 is provided as a panel which senses pressure applied when a stylus or a user's hand touches the panel. The touch pad 10 has a plurality of key areas. The touch pad 10 functions as a keyboard which generates a key signal according to a touch input of the respective key areas and supplies the key signals to the controller 50.

The touch pad 10 senses whether touch input is generated by contact with the touch pad 10. Then, if touch input is generated, the touch pad 10 generates the key signal according to the touch input. A firmware is coupled to the planar bottom of the touch pad 10. The firmware may generate the key signal after determining the key areas of the input generated on the touch pad 10. Then, the character values corresponding to the generated key signal are displayed on the display 40 by the controller 50, which will be described later.

Figure 3A:
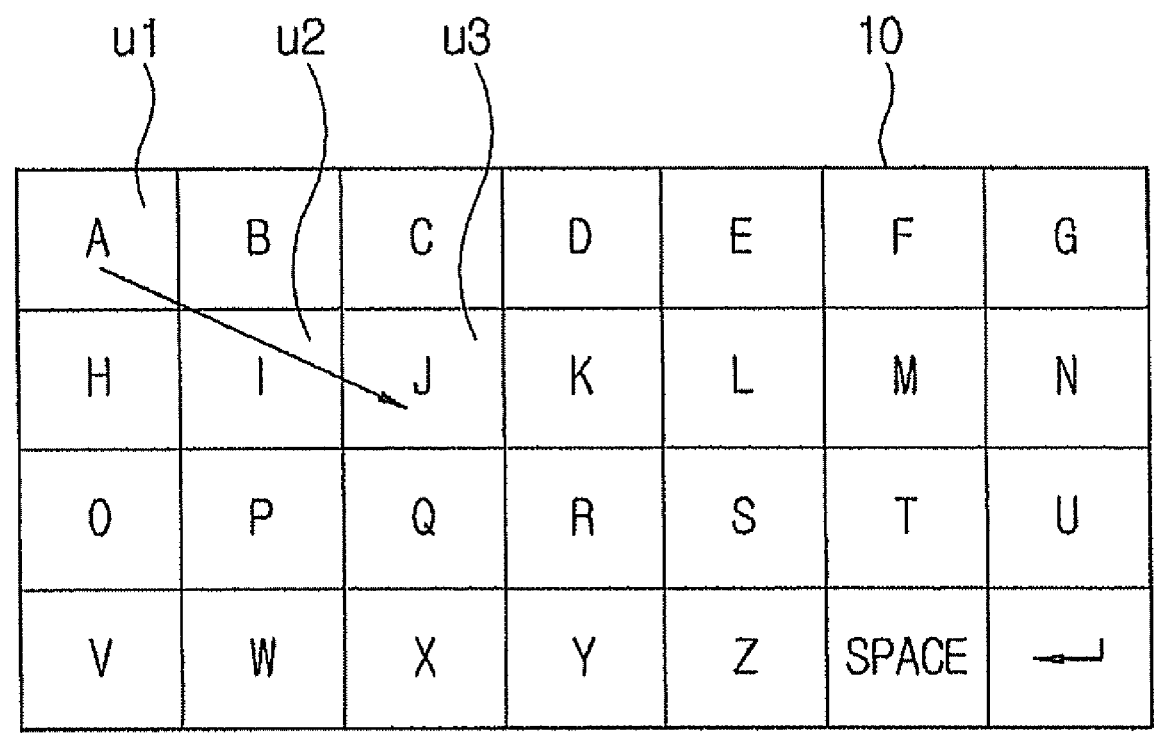
Figure 3B:
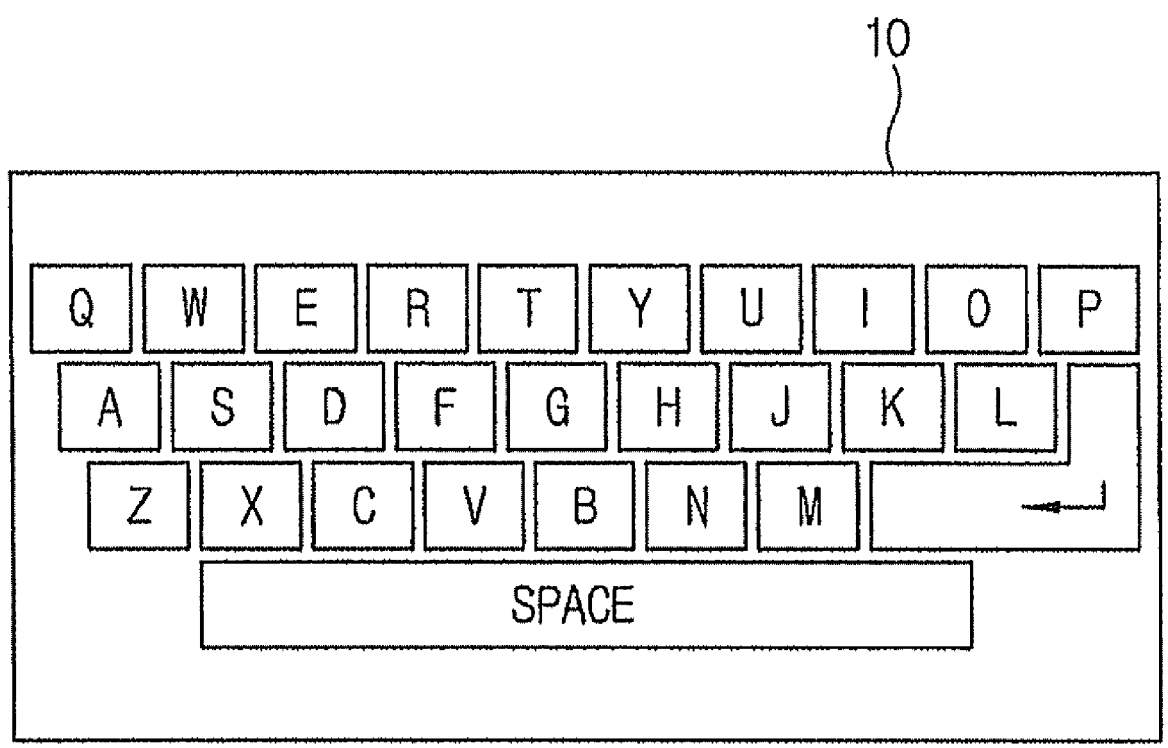

The touch pad 10 will be described in more detail with reference to FIGS. 3A and 3B. FIGS. 3A and 3B illustrate an example in which character values corresponding to the key areas of the touch pad 10 are preset. In this example, the character values are English capital letters; however, the key areas may represent any character set, such as English lower case letters, Korean, Japanese, etc.

As shown in FIG. 3A, the touch pad 10 is divided into a plurality of key areas, and the character values (the characters making up the English alphabet) are arranged in the respective key areas. The key areas may have the same arrangement as the keyboard, as shown in FIG. 3B. The character values corresponding to the respective key areas may be set by the user. Other aspects of the invention may employ other arrangements of the key values, depending on the circumstances. For example, a touch screen included in a mobile phone may have an arrangement corresponding to the arrangement of keys on a phone.

When the user moves an input device across the touch pad 10, the touch pad 10 performs the function of a mouse by moving the pointer on the display 40 according to movement by contact of the user. The input device may be a stylus (such as a stylus manufactured especially for use with the touch pad 10, a pen, a pencil, or the like) or the user's finger. The touch pad 10 is connected with the controller 50 through a PS/2 interface method, and may provide the input signal generated by a user's operation. However, the interface is not limited to PS/2 as long as the input device and the controller 50 can be connected to each other. According to other aspects of the present invention, the interface may be a Universal Serial Bus (USB) interface.

The user selecting unit 30 comprises keys to set a user environment to input characters through the touch pad 10. The user selecting unit 30 may be provided on one side of the computer system. Whether the touch pad 10 will perform the function of the keyboard or the function of the mouse may be set through the user environment, for example by a dialog box or pull-down menu. In addition, the kind of languages (such as Korean, English upper-case letters, English lower-case letters, Japanese, and special characters) of the character values corresponding to the key areas of the touch pad 10 can be set through the user environment.

A relation table is stored in the storing unit 20. The relation table relates the character values to each of the key areas of the touch pad 10. The storing unit 20 may be provided as an EEPROM (Electrically Erasable Programmable Read-Only Memory), an EPROM (Erasable Programmable Read-Only Memory), or any type of recording media. Various types of displays 40 may be used, such as a liquid crystal display (LCD) or a plasma display panel (PDP), and displays an image signal supplied from the controller 50.

The controller 50 reads, from the storing unit 20, the character values corresponding to the areas where the key signal inputted onto the touch pad 10 was generated and displays the character values on the display 40. If successive key signals are generated, the controller 50 sequentially reads the character values corresponding to the successive key areas to changeably display the character values on the display 40. The controller 50 may be provided as a CPU or a MICOM.

As shown in FIG. 1, the controller 50 comprises a driver 53, and an application 51. According to other aspects of the present invention, the controller 50 may include other components in addition to the driver 53 and the application 51. Similarly, the functionality of two or more components may be performed by a single component.

The driver 53 reads character values corresponding to the key areas in which the touch input is generated from the storing unit 20 on the basis of the key signal generated from the touch pad 10. The driver 53 converts the key signal into the character values. The driver 53 sequentially reads the character values corresponding to the successive key areas when successive key signals are generated and sequentially converts the successive key signals into the character values. The driver 53 converts the character values corresponding to the key signal outputted from the touch pad 10 according to the user environment preset by the user through the user selecting unit 30.

The application 51 processes the character values converted by the driver 53 and displays the converted character values on the display 40. The character values that the application 51 processes are processed the in the same fashion as those inputted from a conventional keyboard. For example, when the user touches the key area u1 of FIG. 3A, the touch pad 10 generates the key signal of the key area u1 and outputs the key signal to the controller 50. The controller 50 receives the key signal and controls the character value 'A' preset in the key area u1 to be displayed on the display 40.

If the user moves the touch input in the direction indicated by the arrow shown in FIG. 3A, from key area u1 to key area u3, the touch pad 10 successively generates the key signal according to the generated touch input and outputs the key signals to the controller 50. As the user moves the touch input in the direction indicated by the arrow, a stream of key signals (i.e., successive key signals) is generated: first a key signal corresponding to key area u1, then a key signal corresponding to key area u2, and finally a key signal corresponding to key area u3. As the controller receives the successive key signals, the controller 50 converts the key signals into the successive character values. In the example shown in FIG. 3, the successive character values are 'A', 'I', and 'J', respectively. Finally, the controller 50 controls the display 40 to display the successive character values in the same location one after another by replacing the previous character value in the stream with the next character value in the stream. First, the controller 50 controls the display to display the character value 'A'. Then, the controller 50 controls the display to replace the character value 'A' with the character value 'I'. Finally, the controller 50 controls the display to replace the character value 'I' with the last of the successive character values, the character value 'J'. The controller 50 continues this process until touch input ceases (disappears) and no key signals are received from the touch pad 10. When touch input ceases, the controller 50 moves the cursor and waits for a next character value to be inputted in the state where the character value 'J' corresponding to the key area u3 is displayed on the display 40.

Figure 2:
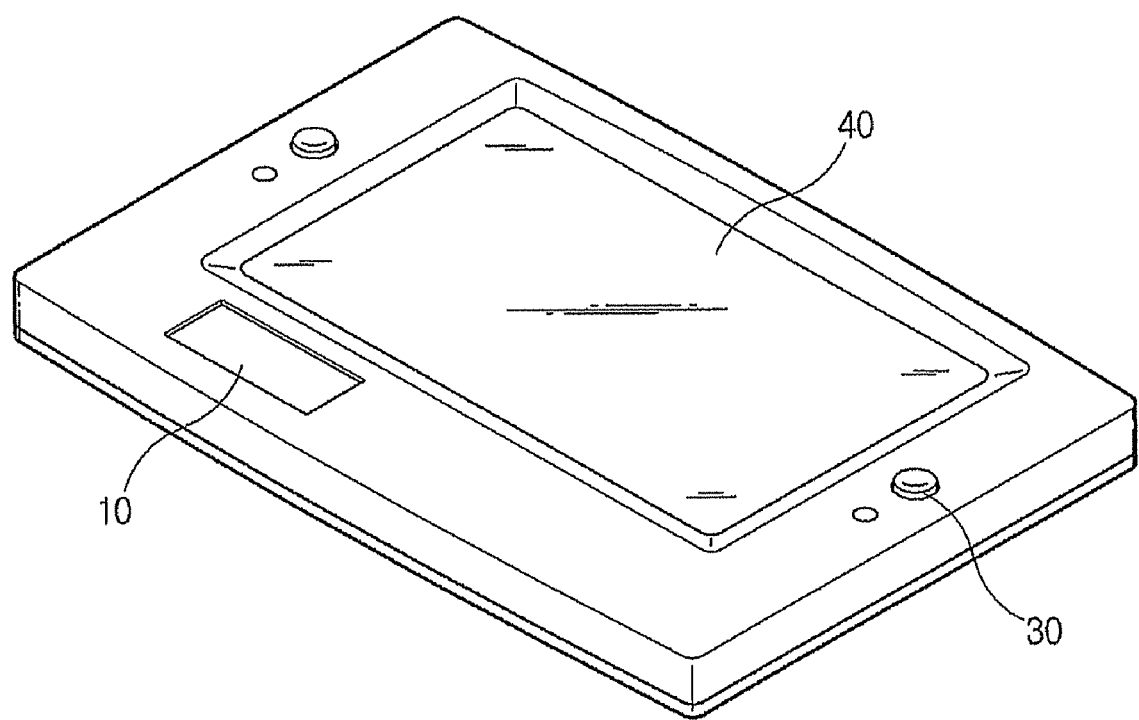
FIG. 2 is a perspective view of the computer system according to an exemplary embodiment of the present invention.

FIG. 2 is a perspective view of the computer system according to an exemplary embodiment of the present invention. The computer system is provided with the display 40, the touch pad 10, and the user selecting unit 30, all arranged on the outside of the computer system. The computer system provides a user environment so that the user can input the character value through the user selecting unit 30.

If the user applies pressure on the touch pad 10 using a stylus or other methods, a key signal corresponding to the key area in which the pressure was generated is made. The character value corresponding to the key area is displayed on the display 40. If the user moves the stylus around the touch pad 10, creating moving touch input, a stream of key signals (successive key signals) is generated and the corresponding character values are successively displayed on the display 40. After the character value the user wants is displayed, the user may cease applying pressure to the touchpad 10. Thereafter, the character value corresponding to the key area where the pressure ceased is displayed on the display 40 and the cursor moves to the next position.

The controller 50 stores in the storing unit 20 the respective character values preset through the user selecting unit 30 corresponding to the plural key areas of the touch pad 10. If a key signal is generated, the controller 50 controls the character values stored in the storing unit 20 to be displayed on the basis of the generated key signal. Accordingly, the characters can be easily inputted through the touch pad 10. Since the function of the conventional keyboard and the mouse are provided only with the touch pad 10, the volume of the computer system is minimized so as to maximize portability. Furthermore, since characters are inputted without using part of the screen to display a virtual keyboard as compared with the conventional touch screen, the touch pad can be conveniently used without taking up space on the screen.

Figure 4:
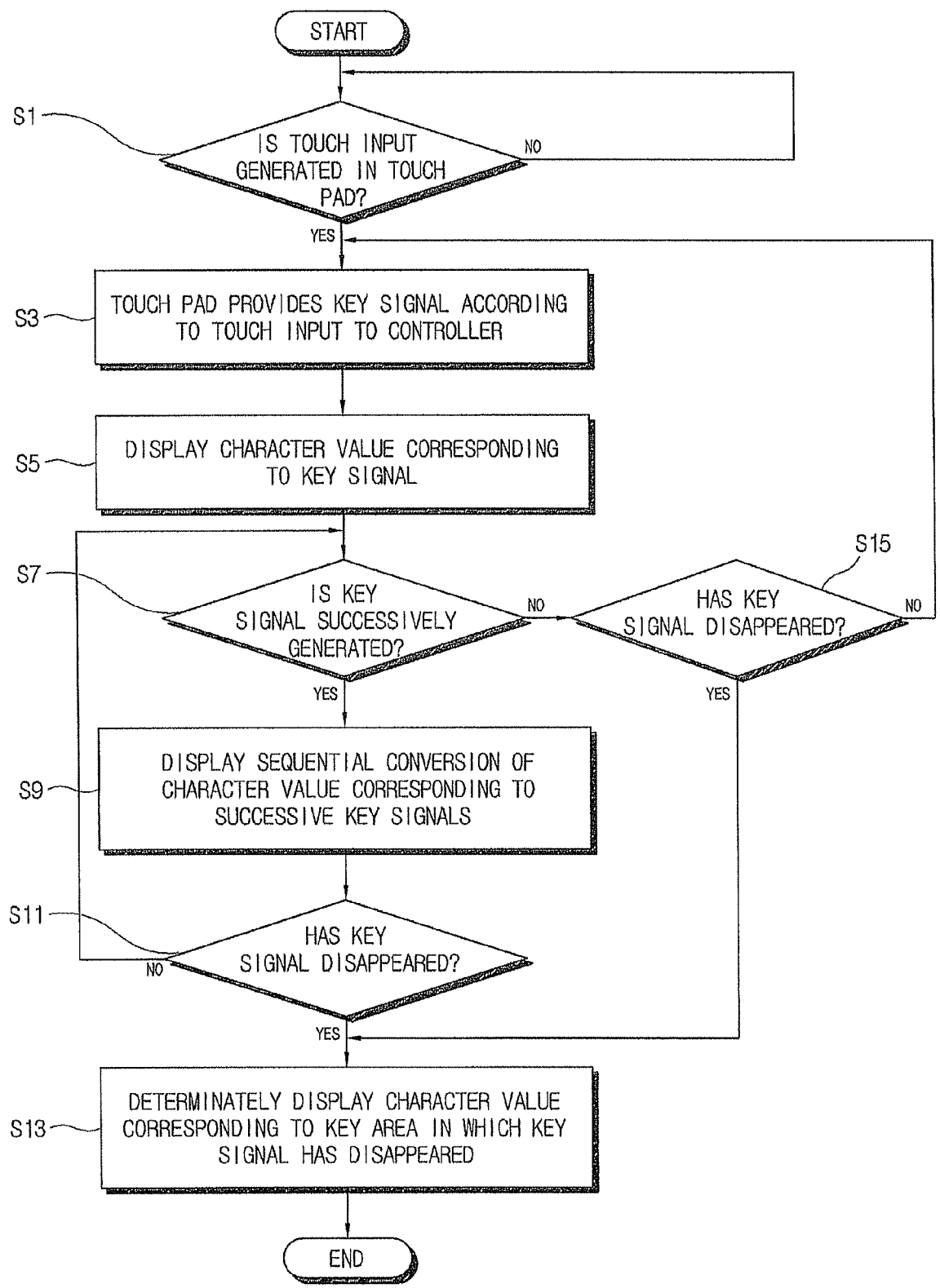
FIG. 4 is a flow diagram illustrating a control method of the computer system according to an exemplary embodiment of the present invention.

A control routine of the computer system according to an exemplary embodiment of the present invention will be described with reference to the flowchart shown in FIG. 4. Here, the computer system has a user environment set to input the character values. As shown in FIG. 4, it is first determined whether touch input is generated on the touch pad 10 (S1).

If the touch input is generated, a key signal is generated corresponding to the key area in which the touch input was generated (S3). As described above, the touch pad 10 comprises the firmware. If the touch input was generated, the firmware generates the corresponding key signal and supplies the key signal to the controller 50. Upon receiving the key signal, the controller 50 reads the character value corresponding to the key area in which the touch input has been generated in the storing unit 20 on the basis of the key signal and displays the character value on the display 40 (S5).

The controller 50 determines whether successive key signals are received from the touch pad 10 (S7). If the successive key signals were received, the controller 50 sequentially reads the successive character values corresponding to the changing key signal in the storing unit 20. The controller 50 sequentially converts the read character value and displays the character values on the display 40 (S9).

The controller 50 determines whether the key signal disappears as the touch input generated on the touch pad 10 disappears (S11). If the key signal disappeared, the controller 50 moves the cursor so that the character value corresponding to the key area in which the key signal has disappeared can be displayed on the display 40 (S13).

If no successive key signals were generated in stage S7, the controller 50 determines whether the key signal has disappeared (S15). If it is determined that the key signal has not disappeared in the stage S15, the controller 50 displays a character value corresponding to the key signal and waits for further input (S5). If the key signal has disappeared in stage S15, the controller 50 moves the cursor S13 so that the character value corresponding to the key area in which the key signal has disappeared can be displayed on the display 40 (S13).

Accordingly, the user can easily input characters by moving the touch input on the surface of the touch pad 10 until a desired character value is displayed. Also, the functions of conventional inputting devices (e.g., keyboard and mouse) can be performed only with the touch pad 10, thereby eliminating the need for additional input devices. In addition, the user can use the whole areas of the display 40.

As described above, the computer system and the control method thereof according to aspects of the present invention can easily input characters through the touch pad. Also, since the function of the conventional keyboard and the mouse can be performed only with the touch pad, the computer system can be minimized, increasing portability.

The computer system can also be conveniently used without a screen interruption since characters can be inputted without using a screen to illustrate a virtual keyboard on the screen in comparison with the conventional touch screen.

The functionality of the controller and other components (such as the firmware) according to aspects of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, etc., including a carrier wave transmitting signals specifying the program instructions, data structures, etc. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention. Although a few embodiments of the present invention have been shown and described, it would be appreciated by those skilled in the art that changes may be made in this embodiment without departing from the principles and spirit of the invention, the scope of which is defined in the claims and their equivalents.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A computer system, comprising:
   a display:
   a touch pad provided as a panel separated from the display and having a plurality of key areas to generate a key signal according to a touch input, the key signal corresponding to one of the key areas;
   a storing unit to store a relation table relating each of a plurality of character values to a corresponding one of the plurality of key areas; and
   a controller to read, from the storing unit, the character value corresponding to a key area corresponding to the key signal generated in the touch pad and to display the character value on the display, and if successive key signals are generated with respect to the plurality of key areas, to sequentially convert the successive key signals into the corresponding successive character values and to display each of the successive character values on the display by replacing a previously displayed character value with the character value to be displayed.

2. The computer system according to claim 1, wherein the controller comprises a driver to convert the key signal generated from the touch pad into the character value corresponding to the key signal corresponding to the key area, and an application to process the character value and to display the character value on the display.

3. The computer system according to claim 1, wherein, when the key signal disappears, the controller displays the character value corresponding to the key area in which the key signal disappeared.

4. The computer system according to claim 1, further comprising:
   a user selecting unit to set the character values corresponding to the key areas;
   wherein the controller stores in the storing unit the character values set by the user selecting unit.

5. The computer system of claim 1, wherein the touch pad is not a display.

6. The computer system of claim 1, wherein the successive key signals form a continuous stream of key signals.

7. A control method of a computer system having a display and a touch pad provided as a panel separated from the display, comprising:
   determining whether a key signal is generated in the touch pad separated from the display;
   displaying a character value on the display corresponding to the key area displayed on the touch pad in which the key signal was generated;
   determining whether successive key signals were generated;
   converting each of the successive key signals into the character value corresponding to the key signal corresponding to the key area if successive key signals were generated; and
   displaying the character values corresponding to the successive key areas if successive key signals were generated.

8. The control method of the computer system according to 7, further comprising displaying the character value corresponding to the key area in which the key signal disappeared if the key signal disappeared.

9. The control method of the computer system according to claim 7, further comprising storing the character value corresponding to the key area.

10. The control method of the computer system according to claim 9, wherein storing the character value comprises setting the character values corresponding to the key areas and storing the set character values.

11. The method of claim 7, wherein the successive key signals form a continuous stream of key signals.

12. A computer system comprising:
    a display:
    a touch pad provided as a panel separated for the display and generating a stream of key signals, each key signal corresponding to a touch input on an area of the touch pad; and
    a controller to receive the stream of key signals from the touch pad, to convert the stream of key signals into a corresponding stream of character values, and to display each character value in the stream of character values on the display, wherein the controller controls the display to replace a prior character value in the stream of character values with a successor character value in the stream of character values.

13. The computer system of claim 12, further comprising a storage unit to store a relation table relating each of the key signals to the corresponding character values.

14. The computer system of claim 12, wherein the controller displays a final character value in the stream of character values without replacing the final character value with another character value.

15. The computer system of claim 12, wherein the controller further comprises a driver to convert the stream of key signals into the corresponding stream of character values.

16. The computer system of claim 12, wherein the controller further comprises an application to display the character values on the display.

17. The computer system of claim 12, wherein the touch pad is not a display.

18. The computer system of claim 12, wherein the stream of key signals is a continuous stream of key signals.

19. A method comprising:
    receiving a stream of key signals from a touch pad provided as a panel separated from a display, the key siunals corresponding to a user's movement of an input device across a plurality of key areas on the touch pad;
    determining a final key value in the stream of key values corresponding to the last key area touched by the user; and
    displaying a character value on the display corresponding to the final key value.

20. The method of claim 19, further comprising moving a cursor to a next position after displaying the character value.

21. The method of claim 19, further comprising:
    displaying a character value corresponding to a key signal in the stream of key signals; and
    replacing the character value displayed with a next character value corresponding to a next key signal in the stream of key signals.

22. The method of claim 19, further comprising:
    setting a correspondence between key signals and character values; and
    storing the correspondence as a relation table in a storage unit.

23. The method of claim 19, wherein the stream of key signals is a continuous stream of key signals.

* * * * *